J. TERRACE.
MACHINE FOR STOKING GAS RETORTS.
APPLICATION FILED NOV. 24, 1915.

1,235,740.

Patented Aug. 7, 1917.
9 SHEETS—SHEET 1.

Fig. 1.

INVENTOR:
JOHN TERRACE
BY: H van Oldenunl
ATTORNEY.

UNITED STATES PATENT OFFICE.

JOHN TERRACE, OF GRIMSBY, ENGLAND, ASSIGNOR TO JAMES GEORGE WILLCOX ALDRIDGE, OF WESTMINSTER, LONDON, ENGLAND.

MACHINE FOR STOKING GAS-RETORTS.

1,235,740. Specification of Letters Patent. Patented Aug. 7, 1917.

Application filed November 24, 1915. Serial No. 63,230.

*To all whom it may concern:*

Be it known that I, JOHN TERRACE, a subject of the King of Great Britain and Ireland, residing at Grimsby, England, have invented certain new and useful Improvements in Machines for Stoking Gas-Retorts and the like, of which the following is a specification.

This invention relates to machines or apparatus for charging gas retorts and the like with coal or simultaneously charging through retorts with coal and discharging or pushing out the coke or spent charge and has for its object to simplify the construction of such machines or apparatus particularly the parts which are required to enter the retort, and to enable the maximum quantity of coal to be introduced at each charge.

In the well-known Fiddes-Aldridge type of gas retort stoking machine the coal is introduced into the retort by a conveyer or charging member formed of vertical side plates with swinging push plates suspended between them on distance stays or bars, the coal being fed between the vertical side plates and pushed by the push plates from an apron plate outside the retort along the bottom of the retort as the charging member is advanced into the retort.

My invention comprises two vertical side plates connected together and held at the required distance apart by suitable stays or distance members to form a bottomless scoop (hereinafter called the scoop) and means located outside the retort for feeding or propelling the coal forward along the bottom of the retort between the side plates of the scoop as the scoop is advanced into the retort, said propelling means being adapted to replace entirely or in part the usual push plates, employed for pushing the charge into the retort. A hinged push plate is provided at the forward end of the scoop and adapted to push out the spent charge in the usual manner as the scoop enters the retort, and means are also provided for preventing the withdrawal of the charge as the scoop is withdrawn from the retort.

In a practical form of the invention the coal propelling means consists of an endless band conveyer mounted on suitable supports on the traveling machine and driven therefrom. The scoop lies immediately over the conveyer, the coal being fed into the same and being supported and fed forward by the conveyer which may be driven at the same speed as the scoop. As the scoop completes its feed stroke, a stop plate is advanced over the conveyer and apron plate and held in the mouth of the retort, as hereinafter described during the return movement of the scoop.

The vertical side plates of the scoop are preferably connected and maintained at the required distance apart by arched stays and may be rigid or jointed in the well known manner.

The invention is hereinafter described with reference to the accompanying drawings in which—

Figs. 1$^a$ and 2$^a$ are sectional elevation and sectional plan respectively taken through a retort showing the scoop in position therein.

Figure 1:
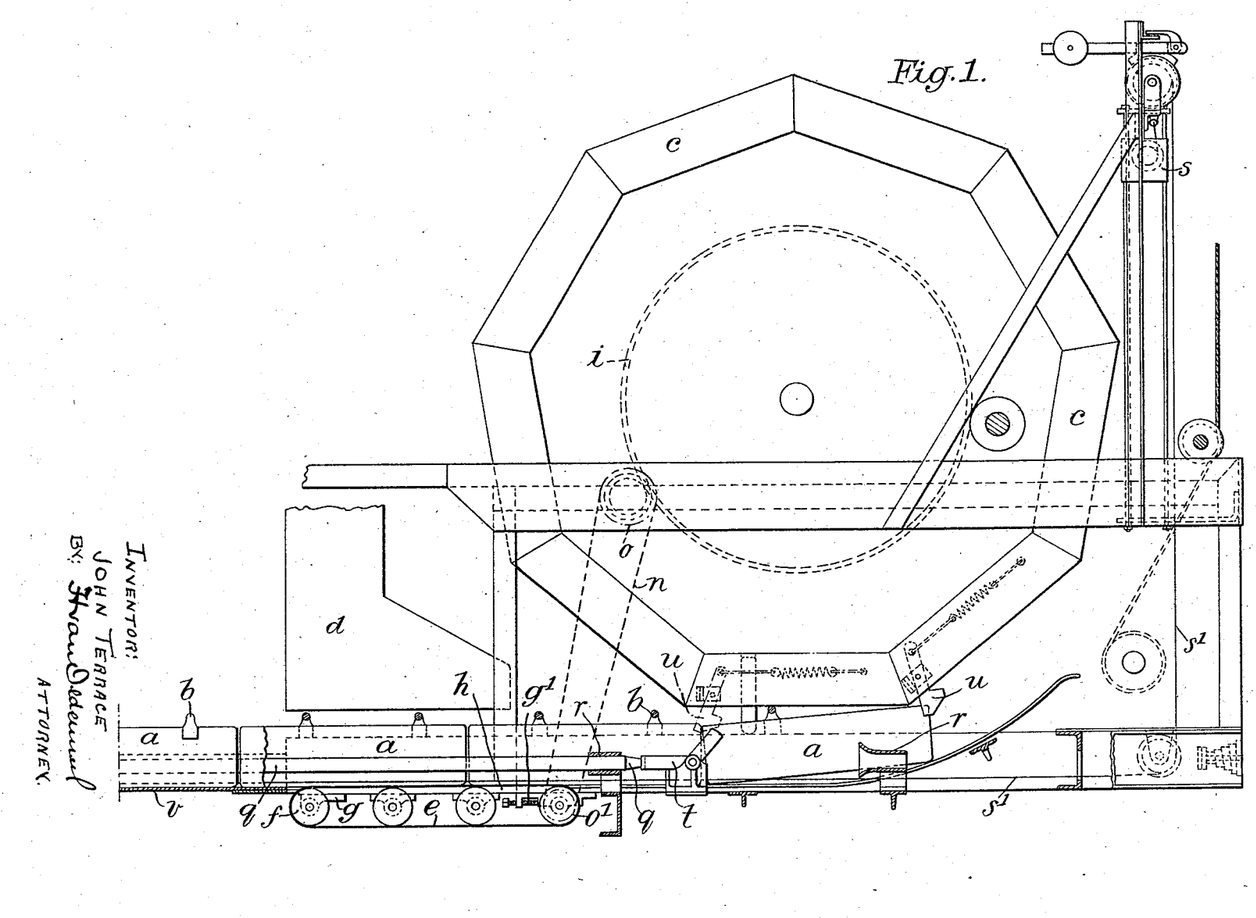
Figure 1 is a sectional side elevation of part of a retort charging and discharging machine showing the machine end of the scoop, the endless band conveyer, the stop with its operating mechanism winding drum and part of the main framework of the traveling machine upon which the charging and discharging apparatus is mounted.
Figure 1A:
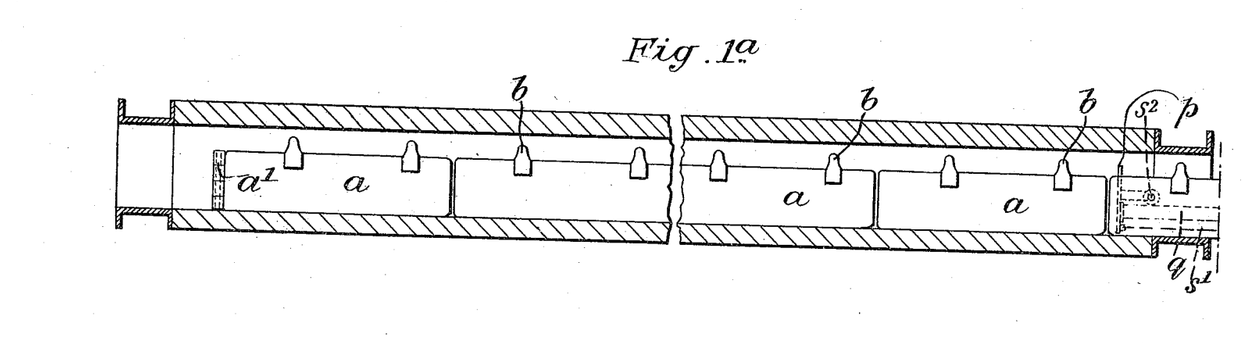
Figure 2:
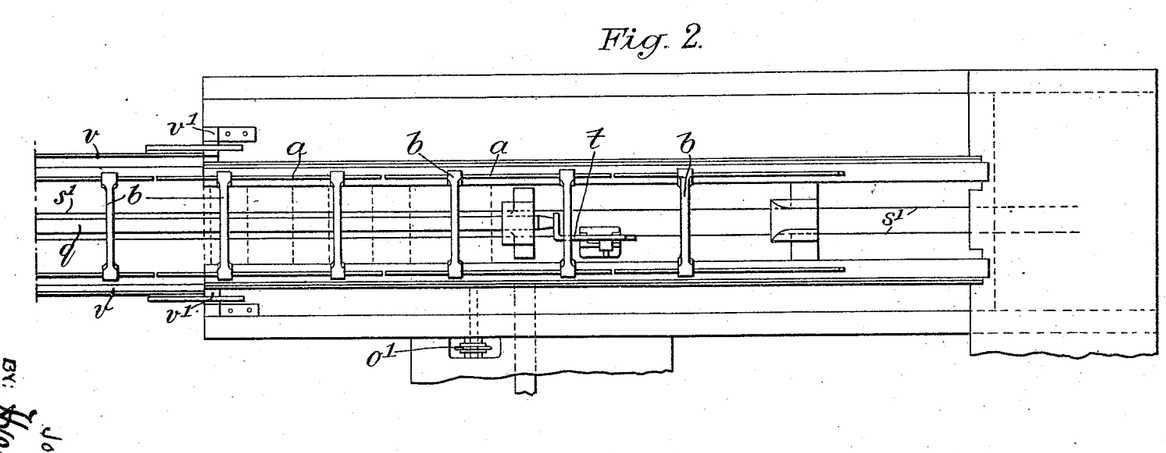
Fig. 2 is a plan illustrating the part of the scoop shown in Fig. 1 and the stop.

In the drawing, the scoop is shown partly in Figs. 1 and 2 and partly in Figs. 1$^a$ and 2$^a$ which are continuations in elevation and plan respectively of Figs. 1 and 2 and said scoop is constructed of side plates $a$ connected together and maintained at the desired distance apart by arched stays or distance pieces $b$. At the forward end a push plate $a^1$ is arranged for pushing out the spent charge and is hinged in the usual manner.

The side plates $a$ of the scoop may be each formed in one continuous length, or they may be divided into sections in the manner illustrated in the drawings, such sections being hinged together in the well-known manner as described, for example in connection with the conveyer or charging and discharging member of the Fiddes-Aldridge stoking machine described in U. S. Patent No. 756,225.

In this form the scoop can be wound on a drum such as $c$ which serves for advancing the scoop into the retort or withdrawing same in the usual way.

Below the chute $d$ which is connected with the feed hopper not shown, and serves for depositing the coal between the side plates $a$ of the scoop, an endless band conveyer $e$ is mounted being supported on rollers $f$ carried on bearing brackets $g$ which are bolted to the vertically adjustable channel frame members $h$ of the traveling machine, the end bearings being mounted to slide in their supporting brackets and provided with screws $g^1$ whereby the tension of the conveyer band can be adjusted.

Figure 6:
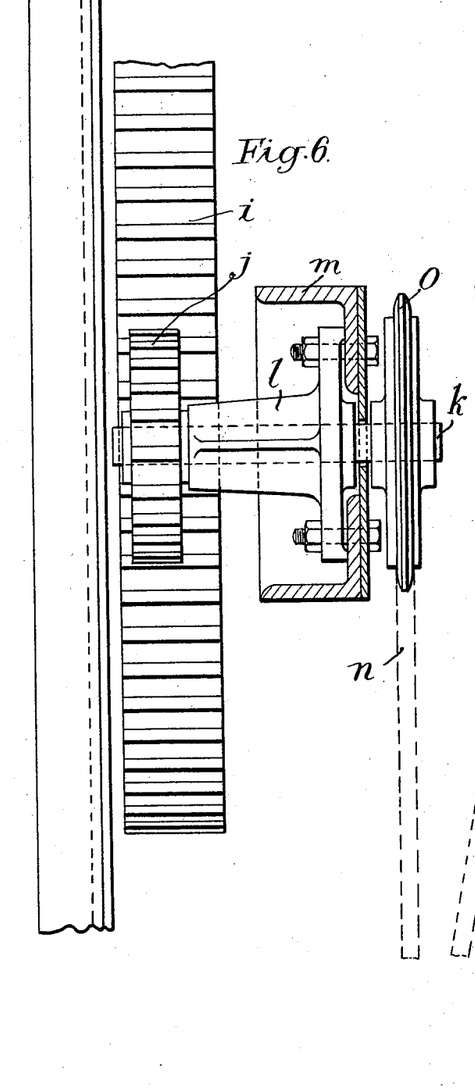
Figure 7:
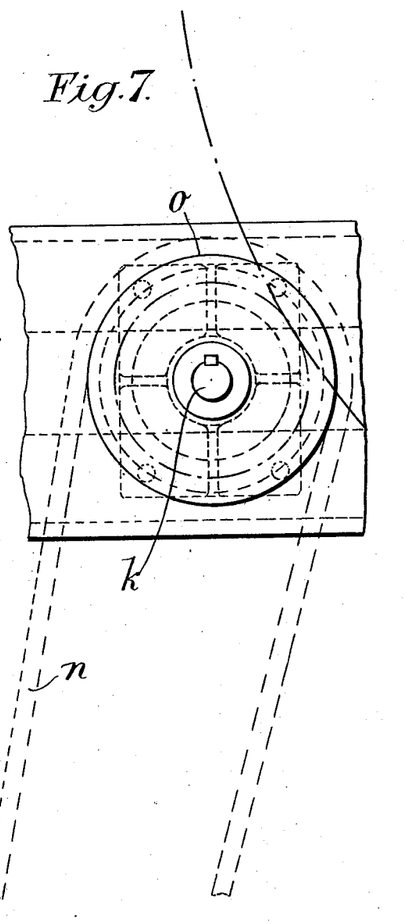

For driving the band conveyer $e$ a toothed wheel $i$ is mounted on the drum $c$ and actuates a pinion $j$ keyed to one end of a shaft $k$ which rotates in a bearing bracket $l$ bolted to a frame member $m$ forming part of the vertically adjustable frame of the traveling machine as clearly shown in Figs. 6 and 7. Power is conveyed to the conveyer $e$ from the shaft $k$ by chain or other gear $n$ for which purpose chain wheels $o$ $o^1$ are mounted on the shaft $k$ and end roller of the conveyer respectively as shown.

Figure 2A:
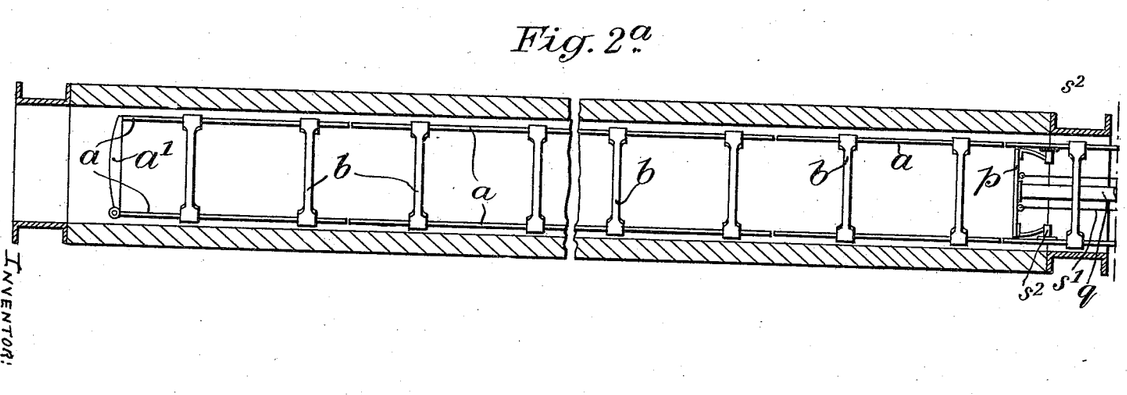
Figure 3:
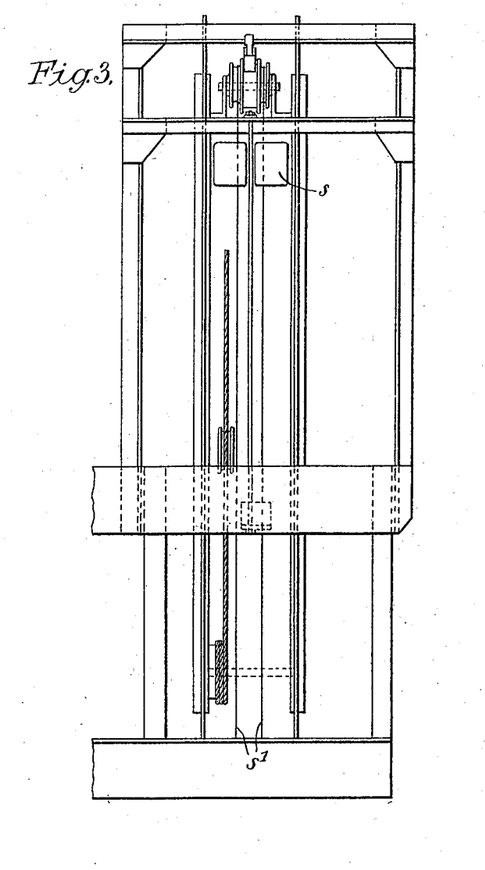
Fig. 3 is a rear end elevation of part of the main framework of the machine illustrating principally mechanism connected with the stop plate.
Figure 4:
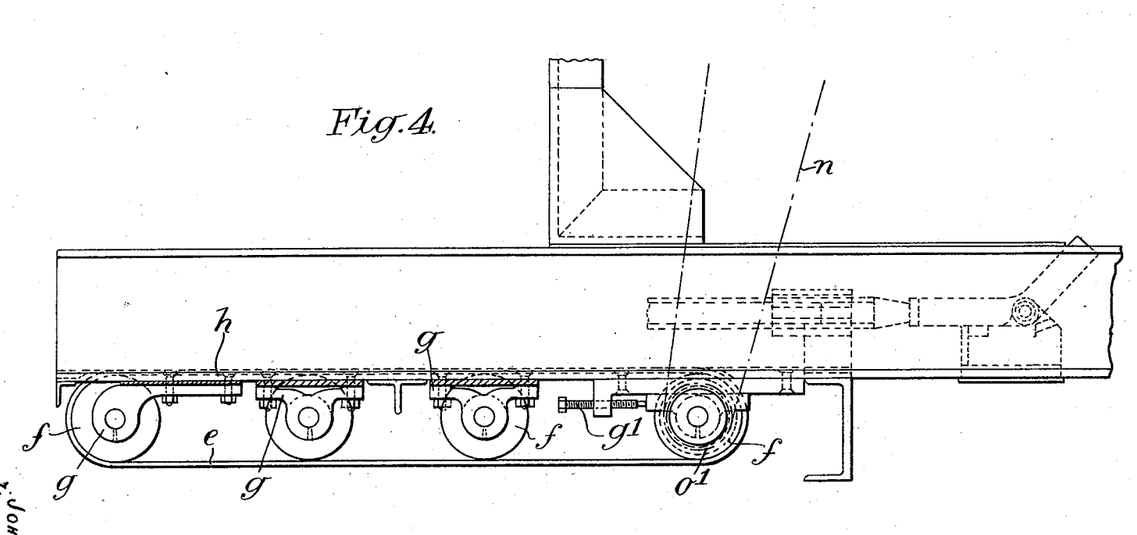
Figs. 4 and 5 are sectional side elevation and plan respectively of a portion of the machine illustrating on a larger scale the endless band conveyer and Figs. 6 and 7 are detail views of driving gear for the band conveyer.
Figure 5:
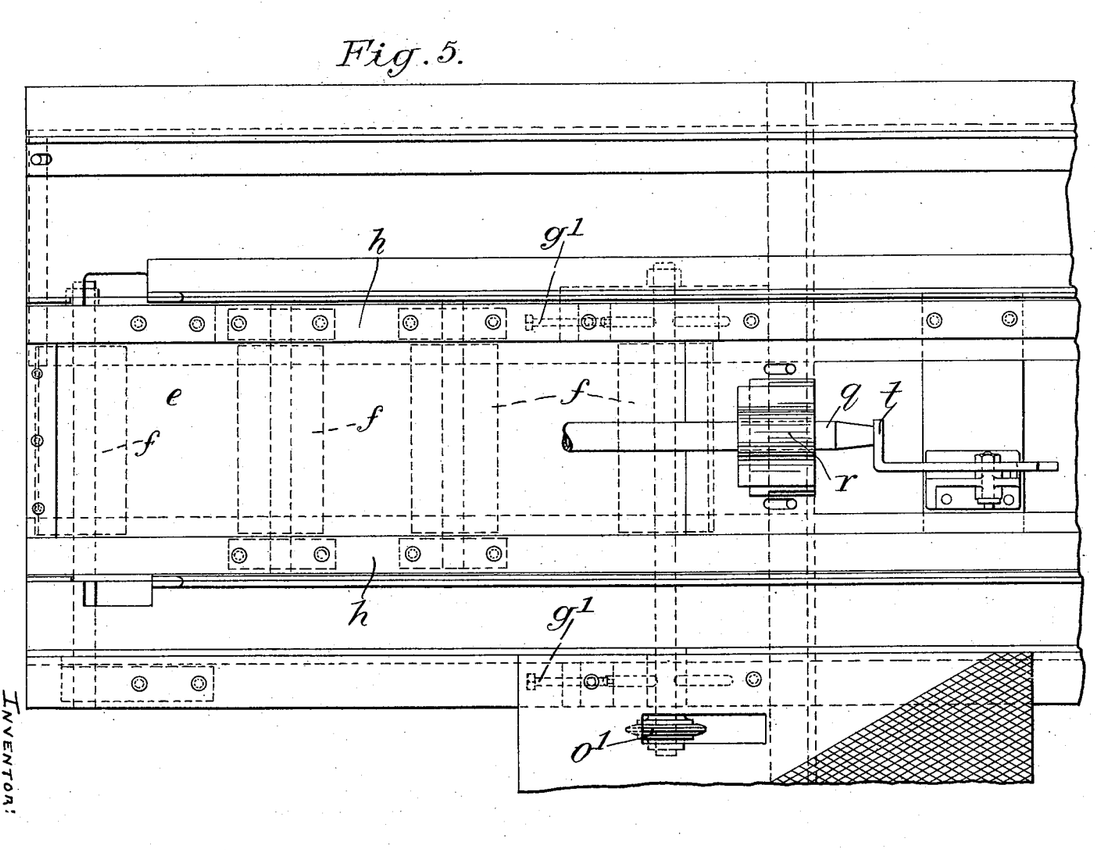

A stop plate $p$ shown in Figs. 1ª and 2ª is fixed to a guide rod $q$ arranged to slide in guides $r$ and is normally held in a retracted position behind the conveyer $e$ by a weight $s$ connected with the stop plate by wire ropes or chains $s^1$ led over suitable guide pulleys on the traveling machine. Pins $S^2$ on the side plates of the scoop are arranged to engage the stop plate and carry it forward with the scoop to push into the retort the last portion of the charge over the apron plate, and when the stop plate reaches the position shown in Figs. 1ª and 2ª inside the mouth of the retort, the guide rod $q$ is engaged by a catch $t$ which maintains the stop plate in position during the subsequent withdrawal of the scoop thus preventing any portion of the charge of coal from being dragged out of the retort by the scoop. When the scoop leaves the retort the stop is released by a trigger or tappet $u$ on the drum $c$ which tilts the catch $t$ allowing the stop plate to be drawn back by the weight $s$.

An apron or bridge plate $v$ is mounted on the traveling machine and arranged to bridge the space between the conveyer band and retort mouth and to form a bottom for the scoop as it passes between the traveling machine and the retort mouth.

Figure 8:
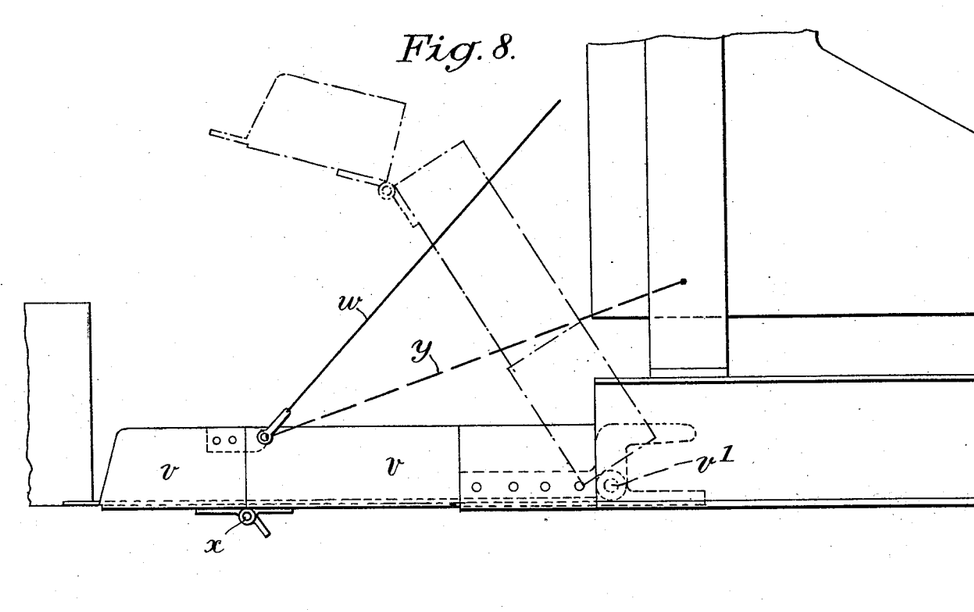
Figs. 8 and 9 are elevation and plan respectively of the apron plate and adjacent parts of the traveling machine to which the apron plate is attached.
Figure 9:
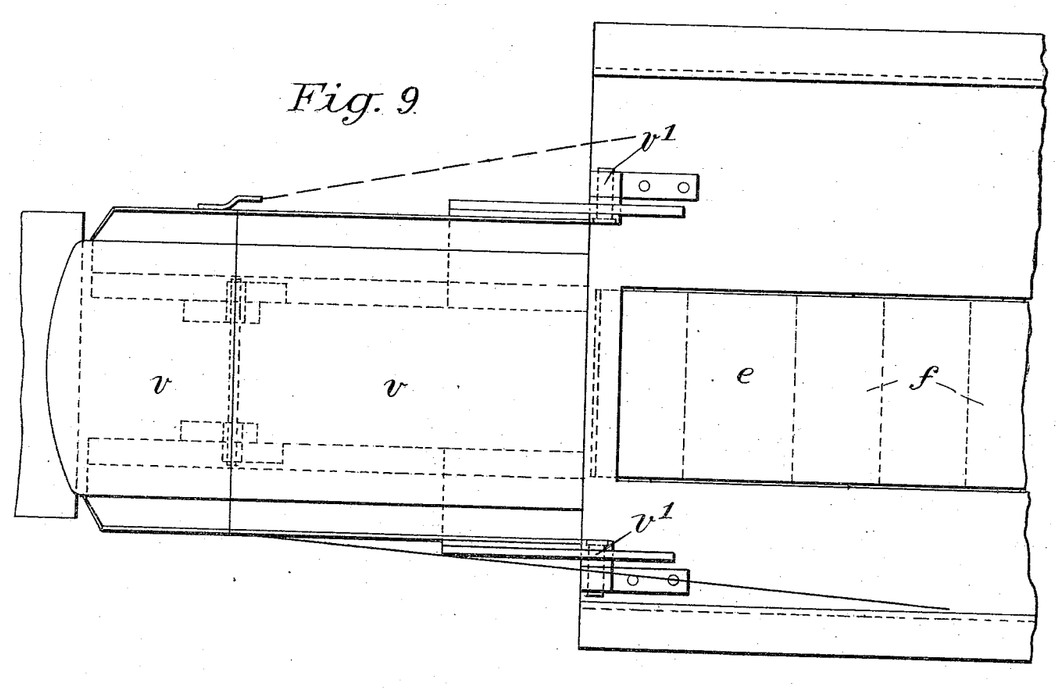

As clearly shown in Figs. 8 and 9, the apron plate $v$ is trough-shaped and pivoted to the main frame at $v^1$ being connected by ropes $w$ or the like with a counterweight not shown. The apron plate may be in two pieces hinged at $x$ and is raised and lowered in the known manner being supported when horizontal by a cord or chain $y$ anchored to the main frame.

In operation the coal is fed by the chute $d$ between the side plates of the scoop on to the band conveyer $e$ which is driven as the scoop is advanced over the apron or bridge plate into the retort.

The coal the full depth of the scoop is thus set in motion in a forward direction and as each successive supply falls between the side plates of the scoop, the forward motion given to the coal while lying on the conveyer $e$ serves to carry it over the apron or bridge plate $v$ into the retort mouth from whence it is pushed along the floor of the retort to the far end by the action of the coal behind as it is fed into the retort by the endless band conveyer or apron and with the aid of the side plates $a$ of the scoop which is caused to travel forward in the usual way simultaneously with the coal.

By this means coal can be placed evenly from end to end of the retort. When the scoop is completing its feed stroke the automatic stop $p$ is brought forward and held in position at the mouth of the retort so that the withdrawal of the scoop does not at the same time drag back the coal.

The machine carrying the charging and discharging apparatus and traveling in front of the retorts is equipped with suitable coal feed hoppers, hoisting gear for adjusting the charging and discharging apparatus to the retorts, and other motor driven gear for operating the scoop and coal propelling means, but such traveling machine and equipment in so far as they are common to gas stoking apparatus at present in use need not be further described here.

What I claim and desire to secure by Letters Patent is:—

1. In a charging and discharging device for gas retorts comprising a bottomless scoop having hinged side plates; means for connecting opposite side plates; a conveyer coöperating with said scoop; a device for feeding material into said scoop and on to the said conveyer; a bridging member between said conveyer and the retort; a drum for taking up the scoop and for projecting it into and withdrawing it from the retort; driving means for said drum and for said conveyer; a stop device operative within said scoop and means for holding the same in position to prevent the dragging back of the material when the scoop is withdrawn from the retort.

2. In a device as described, a bottomless scoop having hinged side plates and a pusher at its forward end; a conveyer coöperating with said scoop; a bridging means between said conveyer and the retort; a drum for projecting the scoop into and withdrawing it from the retort; means for driving said drum and means for transmitting power from said drum to said conveyer.

3. In a device as described, a bottomless scoop having side plates hingedly connected to each other; spacer bars connecting opposite side plates; an endless conveyer coöperating with said scoop; a device for feeding material into said scoop and onto said conveyer; a bridging member between said conveyer and the retort; a drum for projecting the scoop into and withdrawing it from the retort; driving means for said drum and said conveyer; a stop device operative within said scoop and normally located at the rear of said conveyer; means for bringing said stop device forward to the mouth of the retort; device for holding said stop in position to prevent the dragging back of the material when the scoop is withdrawn and means for returning the stop to its initial position.

4. In a device as described, a bottomless scoop having jointed side plates; spacer bars connecting opposite side plates; a conveyer coöperating with said scoop; a bridging member between said conveyer and said retort; a drum for taking up the scoop and for projecting the same into and withdrawing it from the retort, and means for driving said drum and said conveyer either simultaneously or alternately.

5. In a device for charging or charging and discharging gas retorts comprising a bottomless scoop having spaced side plates; a conveyer coöperating with said scoop; a bridging member between said conveyer and the retort; a stop device operative within said scoop, and pins on the inside faces of said side plates adapted to engage said stop device.

6. In a device as described, a bottomless scoop having jointed side plates; spacer bars connecting opposite side plates; a drum for projecting the scoop into and withdrawing it from the retort; a stop device operative within said scoop; pins on the inside faces of said side plates adapted to engage said stop device as the scoop is projected into the retort and releasing means for returning the stop device to its initial position.

7. In a charger or discharging charger for gas retorts comprising a bottomless scoop having hinged side plates; an endless conveyer coöperating with said scoop; a stop plate operative in said scoop, and means for advancing the stop plate into the retort and for withdrawing it therefrom.

8. In a device for charging and discharging gas retorts, the combination of spaced side plates connected together and forming a bottomless scoop; a bridging member forming a temporary bottom for the scoop as it is moved into the retort; a device for feeding material into said scoop, and conveying means located outside of said retort for propelling the material along the bottom of the retort as the scoop is projected into said retort.

9. In a device as described, a bottomless scoop; means for projecting said scoop into the retort and for withdrawing it therefrom; a stop device operative within said scoop; means on said scoop to engage said stop device and to advance it into the retort; means for holding the stop device in position to maintain the charge in the retort during the withdrawal of the scoop, and means for returning the stop device to its normal position.

In testimony whereof I have affixed my signature, in presence of two witnesses.

JOHN TERRACE.

Witnesses:
  A. J. ELMER,
  J. WALKER HARTLEY.

Copies of this patent may be obtained for five cents each, by addressing the "Commissioner of Patents, Washington, D. C."